US 8,832,212 B1

(12) United States Patent
Shah

(10) Patent No.: US 8,832,212 B1
(45) Date of Patent: Sep. 9, 2014

(54) METHOD OF CONTINUING CONVERSATIONS ON A SOCIAL NETWORK OVER CHAT

(75) Inventor: Chirag Shah, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 201 days.

(21) Appl. No.: 13/366,234

(22) Filed: Feb. 3, 2012

(51) Int. Cl.
*G06F 15/16* (2006.01)
*H04L 12/58* (2006.01)
*H04L 15/32* (2006.01)

(52) U.S. Cl.
CPC .............. *H04L 12/588* (2013.01); *H04L 12/581* (2013.01); *H04L 15/32* (2013.01); *H01L 51/04* (2013.01)
USPC ........................................................ 709/206

(58) Field of Classification Search
CPC ..... H04L 12/581; H04L 12/588; H04L 51/04; H04L 51/32
USPC ........................................................ 709/206
See application file for complete search history.

(56) References Cited

U.S. PATENT DOCUMENTS

| 2004/0078432 | A1* | 4/2004 | Manber et al. ................. 709/205 |
| 2006/0168037 | A1* | 7/2006 | Audu et al. .................... 709/206 |
| 2010/0005402 | A1* | 1/2010 | George et al. ................. 715/758 |
| 2011/0145164 | A1* | 6/2011 | Lavoie et al. ................ 705/36 R |
| 2012/0324042 | A1* | 12/2012 | Graham et al. ............... 709/217 |

* cited by examiner

*Primary Examiner* — Jeong S Park
(74) *Attorney, Agent, or Firm* — McDermott Will & Emery LLP

(57) ABSTRACT

A system and method for initiating instant messaging within a social networking website. In one aspect, a method includes providing for display of a post associated with a first user and a second user within the social networking website and providing for display of a graphical component within the social networking website, and the graphical component provides an interface for requesting communication related to the post by instant messaging. The method further includes receiving a request for communication related to the post by instant messaging via the graphical component and initiating instant messaging between the first user and the second user in response to the received request for communication related to the post. Machine-readable media are also provided.

20 Claims, 5 Drawing Sheets

METHOD OF CONTINUING CONVERSATIONS ON A SOCIAL NETWORK OVER CHAT

BACKGROUND

1. Field

The present disclosure generally relates to social networking, and more particularly to providing for display of a message within a social networking website.

2. Description of the Related Art

Social networks currently allow users to post public messages, and other users may comment publicly on the message. These comments may be seen or shared (reposted) by anyone viewing the public message.

SUMMARY

The disclosed subject matter relates to initiating instant messaging within a social networking website. The method includes providing, using one or more computing devices, for display of a post within the social networking website that is associated with a first and a second user. The method also includes providing, using the one or more computing devices, for display of a graphical component within the social networking website, wherein the graphical component provides an interface for requesting communication related to the post by instant messaging. The method additionally provides for receiving, using the one or more computing devices, a request for communication related to the post by instant messaging via the graphical component and initiating, using the one or more computing devices, instant messaging between the first and second user in response to the received request for communication related to the post.

The disclosed subject matter further relates to a system for providing for initiating instant messaging within a social networking website. The system includes one or more processor(s) and a memory containing processor-executable instructions. When executed by the processor(s), the system provides for display of a post within the social networking website, the post being associated with a first user, a second user, and a third user. The system also provides for display of a graphical component within the social networking website, wherein the graphical component provides an interface for requesting communication related to the post by instant messaging. The system further provides for the receipt of a request for communication related to the post by instant messaging via the graphical component, the initiation of instant messaging between the first user, the second user, and the third user in response to the received request for communication related to the post, and the sending of a notification to each user of the first user, the second user, and the third user that is idle within the social networking website or offline.

The disclosed subject matter also relates to a machine-readable storage medium comprising machine-readable instructions for initiating instant messaging within a social networking website. The method includes providing for display of a post within the social networking website, the post being associated with a first user, a second user, and a third user. The method further includes providing for display of a graphical component within the social networking website, wherein the graphical component provides an interface for requesting communication related to the post by instant messaging. The method also includes receiving a request for communication related to the post by instant messaging via the graphical component and initiating instant messaging between the first user, the second user, and the third user in response to the received request for communication related to the post and sending a notification to each user of the first user, the second user, and the third user that is idle within the social networking website or offline.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

OVERVIEW

The disclosed subject matter describes systems and techniques for initiating instant messaging within a social networking website. A post is created and published by a user. The post is posted publicly to at least some other users on the social networking site. Users who have access to the post are presented with a graphical component (e.g., a radio button) through the user interface in which the users view the post allowing the second user to respond to the post, the user's own comment, or another user's comment via instant messaging. The method accommodates chats directed to the original poster or posters and commenter, multiple users and users that are offline at the time that the chat request is made.

For example, a first user publishes a post. A second user comments on the post. Following the posted comment, the user elects to initiate a chat with the poster by selecting a graphical component through a user interface for that purpose. If the original poster is currently online, a chat window is opened in both the original poster and the user's social networking user interface.

If several users have commented on the original post, a user may elect to initiate a chat with some or all users who have previously commented on the post in addition to the poster. A user may also elect to initiate a chat with the poster in lieu of commenting on the post publicly. If the poster or another user is idle within the social networking website or offline at the time the chat is initiated, a notification is sent to that user indicating that a chat has been initiated.

EXAMPLE ARCHITECTURES

Figure 1:
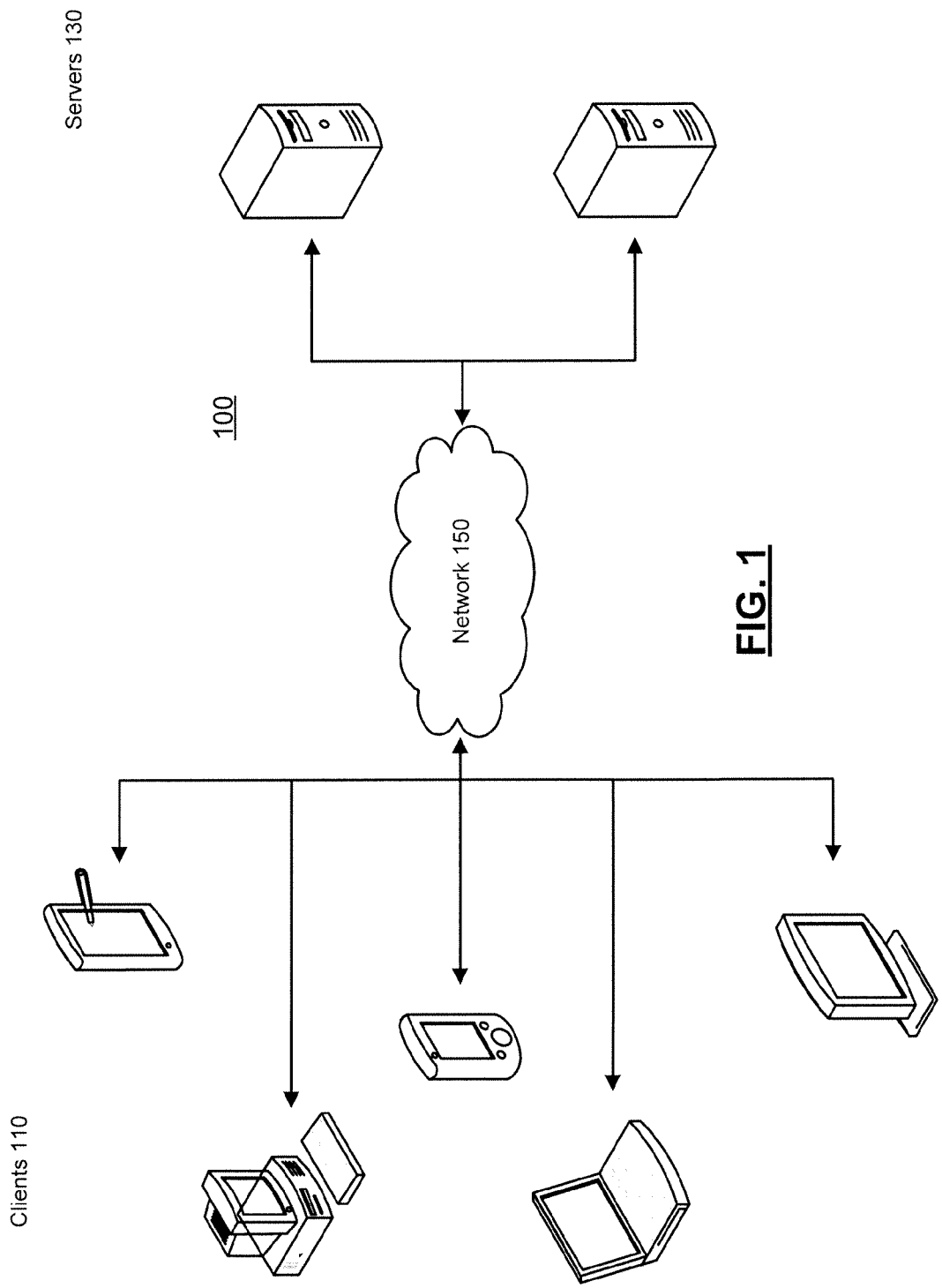
FIG. 1 illustrates an example architecture for initiating instant messaging within a social networking website.

Turning to the drawings, FIG. 1 illustrates an example architecture 100 for initiating instant messaging within a social networking website. The architecture 100 includes computing devices connected over a network 150. The phrase "computing device" as used herein encompasses its plain and ordinary meaning, including, but not limited to any device that contains any appropriate processor, memory, and communication capabilities for allowing the continuation of conversations on a social network over chat including appropriate clients and servers. The architecture may include computing devices such as clients 110 and servers 130 connected over a network 150.

Each of the clients 110 is configured to download, install, and run a web browser that can access a social networking website as disclosed herein. The web browser is configured to run on clients 110 that can be, for example, desktop computers, laptop computers, mobile devices (e.g., a smartphone, tablet computer, or PDA), set top boxes (e.g., for a television), televisions with one or more processors embedded therein or coupled thereto, video game consoles, or any other devices having appropriate processor, memory, and communications capabilities.

The system is comprised of client(s) 110, server(s) 130 and the network 150 in any combination or configuration that facilitates the display of a message within a social networking website. For purposes of load balancing, multiple servers 130 can be used. In certain instances, different versions and/or configurations of the system that include subject technology as disclosed herein are available for download from a server 130 and subsequent installation on client 110. The servers 130 can be any device having an appropriate processor, memory, and communications capability for hosting the data for installing and hosting the system. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a ring network, a mesh network, a star-bus network, tree or hierarchical network, and the like.

Figure 2:
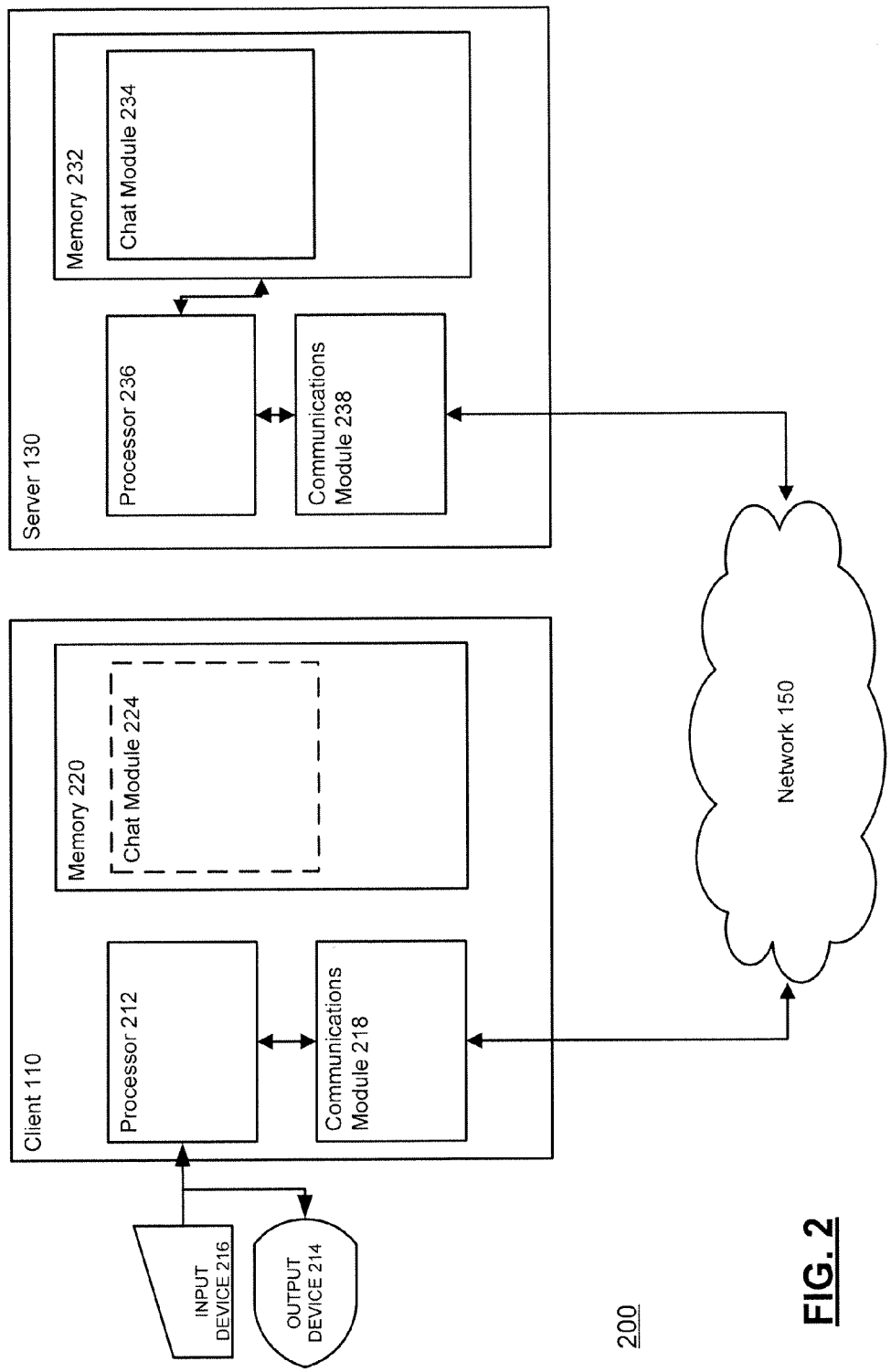
FIG. 2 is a block diagram illustrating an example client and server from the architecture of FIG. 1 according to certain aspects of the disclosure.

FIG. 2 is a block diagram illustrating an example system 200 including a client and server connected through a network 150 from the architecture 100 of FIG. 1 according to certain aspects of the disclosure. The client 110 and the server 130 are connected over the network 150 via respective communications modules 218 and 238 and are configured to interface with the network 150 to send and receive information, such as data, requests, responses, and commands to other devices on the network. The communications modules 218 and 238 can be, for example, modems or Ethernet cards.

The client 110 includes a processor 212, a communications module 218, and a memory 220 that may include a chat module 224.

The processor 212 of the client 110 is configured to execute instructions, such as instructions physically coded into the processor 212, instructions received from software in memory 220, or a combination of both. Processor 236 is configured to execute instructions, such as instructions physically coded into the processor 236, instructions received from software in memory 232, or a combination of both. The input device 216 may provide textual information to processor 212 which is processed by a software module stored in memory 220. The textual information may then be sent through network 150 via communications module 218 to server 130, which receives the information through communications module 238.

Server 130 includes a processor 236, a communications module 238, and a memory 234 that may include a chat module 234. Processor 236 processes information from chat module 234 and sends information through communications module 238, through network 150, to client 110 to be displayed on output device 214.

EXAMPLE PROCESS

Figure 3:
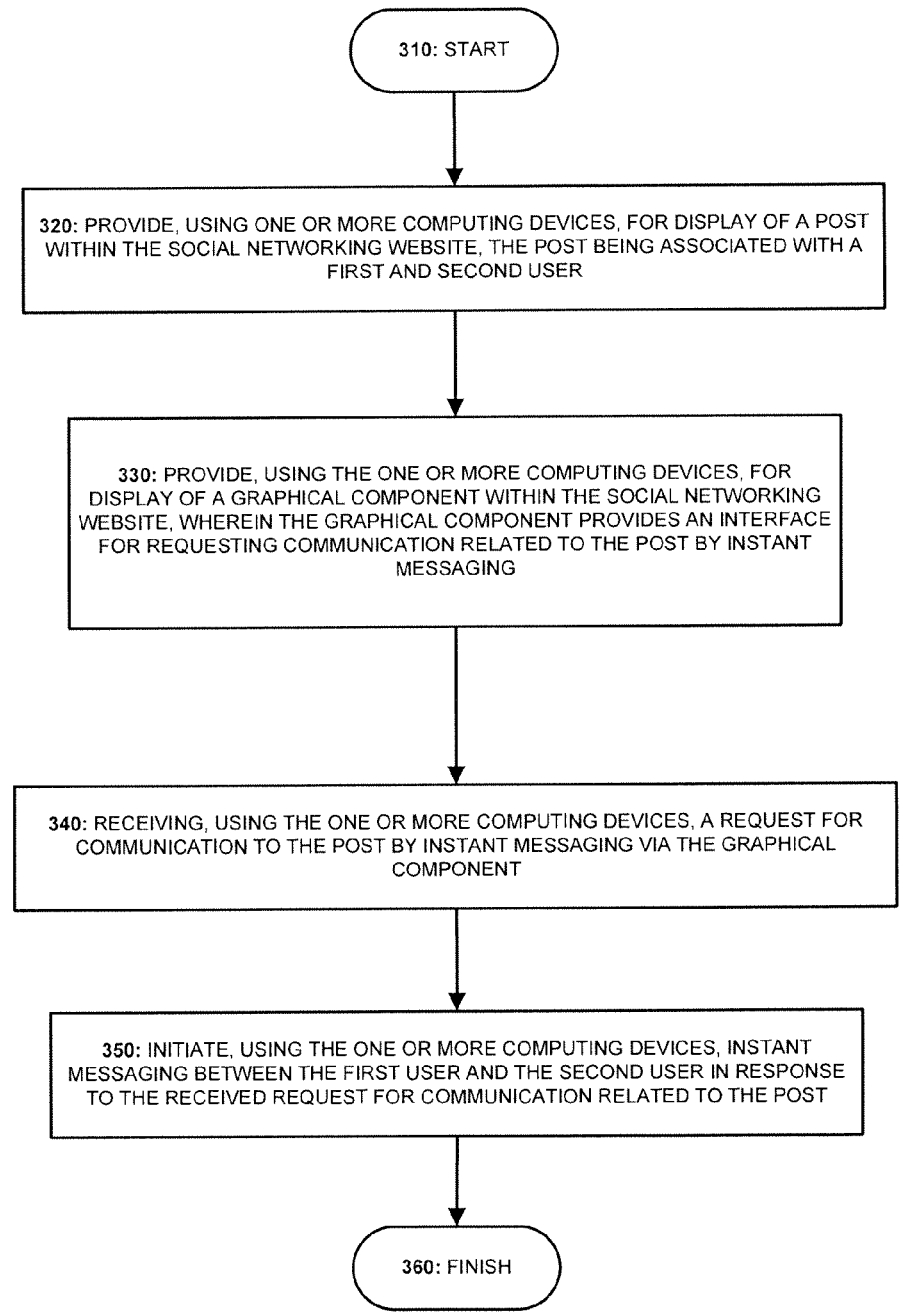
FIG. 3 illustrates an example process for initiating instant messaging within a social networking website.

FIG. 3 illustrates an example process 300 for initiating instant messaging within a social networking website as shown by the example client 110 and server 130 of FIG. 2 that can provide for initiating instant messaging within a social networking website.

Following block 310, in block 320, a user publishes a post within a social networking website. The post may be published to the poster's user page, published to selected users, or be made publicly available on the social networking website. A first user may be the user who has posted the post. A second user may be a commenter who has responded to the post. A second user may be a user who has access to the post and wishes to communicate by chat, instead of responding publicly to the post through a comment.

In block 330, a graphical component is displayed to the user within the social networking website. The graphical component provides the user with an interface to request communication related to the post by instant messaging. The graphical component may appear throughout the social networking website in any user interface in which the post appears.

The user who is the original poster may have the graphical component displayed on the user interface in which the original poster may see his own post. The graphical component may also be displayed for any user who may view the post itself. The graphical component may provide the option of choosing or restricting the users that are invited into the chat. The graphical component may facilitate a poster who initiates instant messaging with one commenter, all the commenters, or any selection of commenters associated with the original post.

Similarly, a user may initiate an instant message conversation with the poster, with the poster and any combination of commenters, or with any selection of commenters to the original post. A user may additionally invite another commenter to the chat if a comment has been posted following the initiation of an instant messaging session.

In block 340, the user uses the graphical component through a user interface of the social networking website to elect to initiate an instant messaging session in response to the post or a comment to the post. The user may click or move his mouse over a portion of the graphical component that indicates the user may wish to discuss the post by communication through chat.

In block 350, instant messaging is initiated between the elected parties. Instant messaging may be initiated by a graphical component such as a chat window that opens within the social networking website. The chat window may be contained within the user's profile or may consist of another window that is opened outside of the user's profile.

The post or comment itself may include an indication that other users are currently participating in a chat specific to that post and/or comment although messages sent between users in an instant messaging session are not displayed publicly with the post or associated comments. A poster may additionally join a user who has commented on the original post after an instant messaging session has been initiated. If a new commenter comments on the original post or one of the comments to the post after an instant messaging session for that post and/or comment has begun, the participants of the existing chat may receive a notification that another user has commented on the post and/or comments. This notification may consist of a notification in the chat window, a message sent to the user's profile in the social networking website, an email to a user's email address, a text message, or the like. The new commenter may be automatically joined into the chat, or one or more of the existing chat participants may need to invite the new commenter into the existing chat. A graphical component may appear in or outside the chat window allowing one or all of the users to invite the new commenter into the existing instant messaging session. If the new commenter is invited to join the chat automatically, or by acceptance or invitation of one or more of the existing participants in the chat, instant messaging is initiated in the new commenter in the same manner in which existing participants have instant messaging initiated with them. The chat conversation may or may not be provided to the new commenter based on user preference.

A user who has attempted to initiate a chat with a poster or other user that is idle within the social networking website or offline may receive a notification message to that effect. The message may be in the form of a message sent within the social networking site, an email sent to an email address of the idle user, a text message, a message displayed in a graphical component on the user's profile, or the like. At any point during the instant messaging session, the participants may end the instant messaging session and resume commenting on the original post without the content of the instant messaging session appearing in post or associated comments. The process ends with block 360.

EXAMPLE INTERFACE

Figure 4:
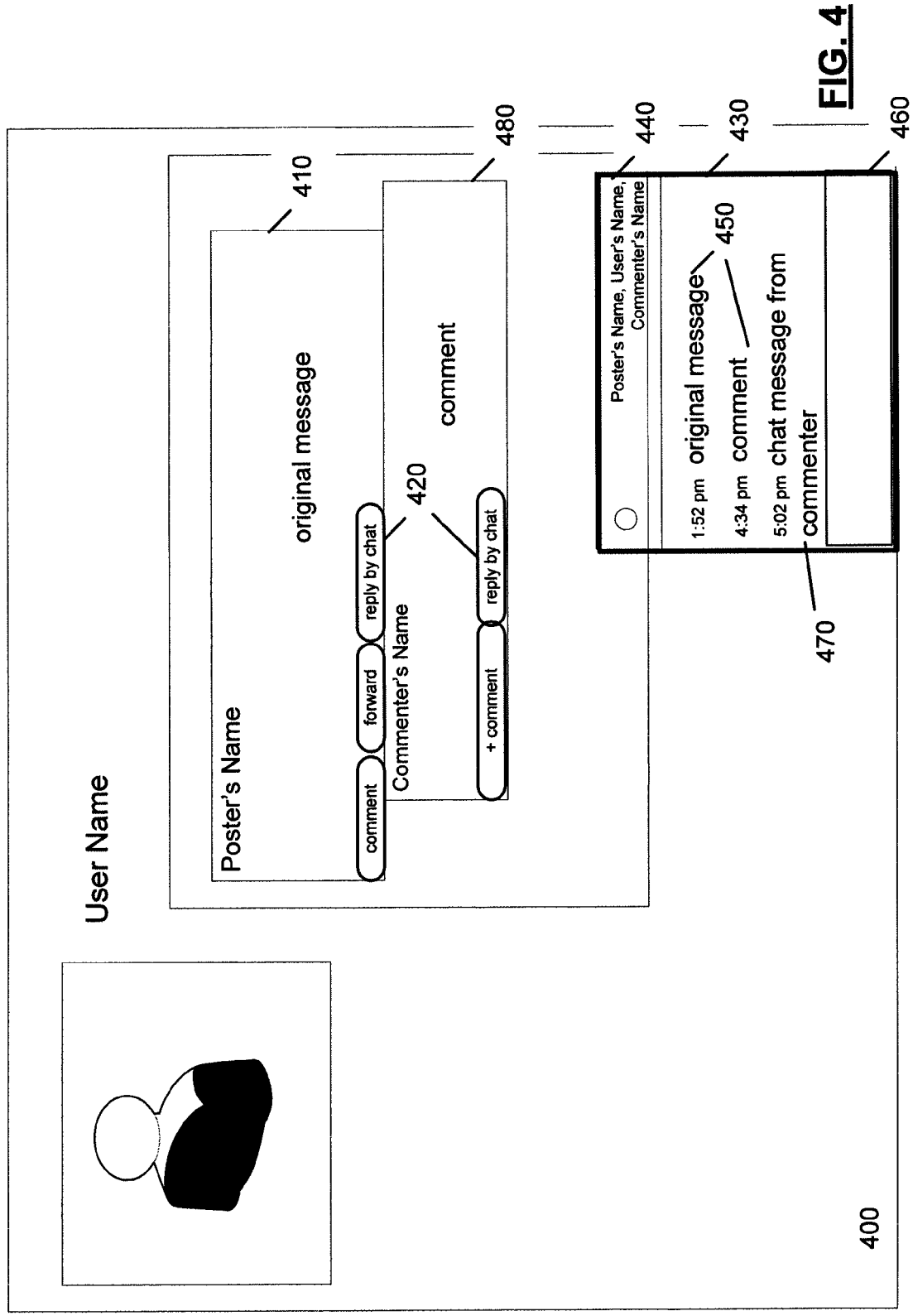
FIG. 4 is an example illustration of a user interface as it relates to one embodiment of the subject disclosure.

FIG. 4 is an example illustration of a user's profile with chat window following the initiation of communication by chat as it relates to one embodiment of the subject disclosure. The user's profile page 400 may display posts 410 associated with the user profile. Posts may consist of posts originating from the user, or may be posts that originate from other users. The post may include the poster's name, and the content of the original message. Graphical components 420 provide an interface for the user to reply to the original message or comment of the post through instant messaging (e.g., chat). The user may select the graphical component by moving his mouse over the graphical component or clicking on the graphical component. Alternatively, selecting the graphical component may open another window or lead to a further menu allowing the user to select the users that will be invited into the instant messaging session. For instance, when the commenter of comment 480 initiates an instant messaging session through the commenting user's graphical component (which corresponds to graphical component 420), instant messaging may be initiated in the user profile 400 through chat window 430, which appears in the user profile 400. Additional information may be presented through chat window 430. The participants that are currently participating in the instant messaging session (or all users that have been invited into the instant messaging session) may be listed in a heading 440. Information 450 related to the originating post and comments may also be provided in chat window 430 as the first message(s) in the instant message session and may include date and time information relating to the posting time of original post 410 and comment 480. Information 450 may alternatively be provided for constant display in another portion of chat window 430 or may appear as the first instant messages in the chat. The user may correspond with other users in the instant messaging session through text box 460.

ADDITIONAL EXAMPLE EMBODIMENTS

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
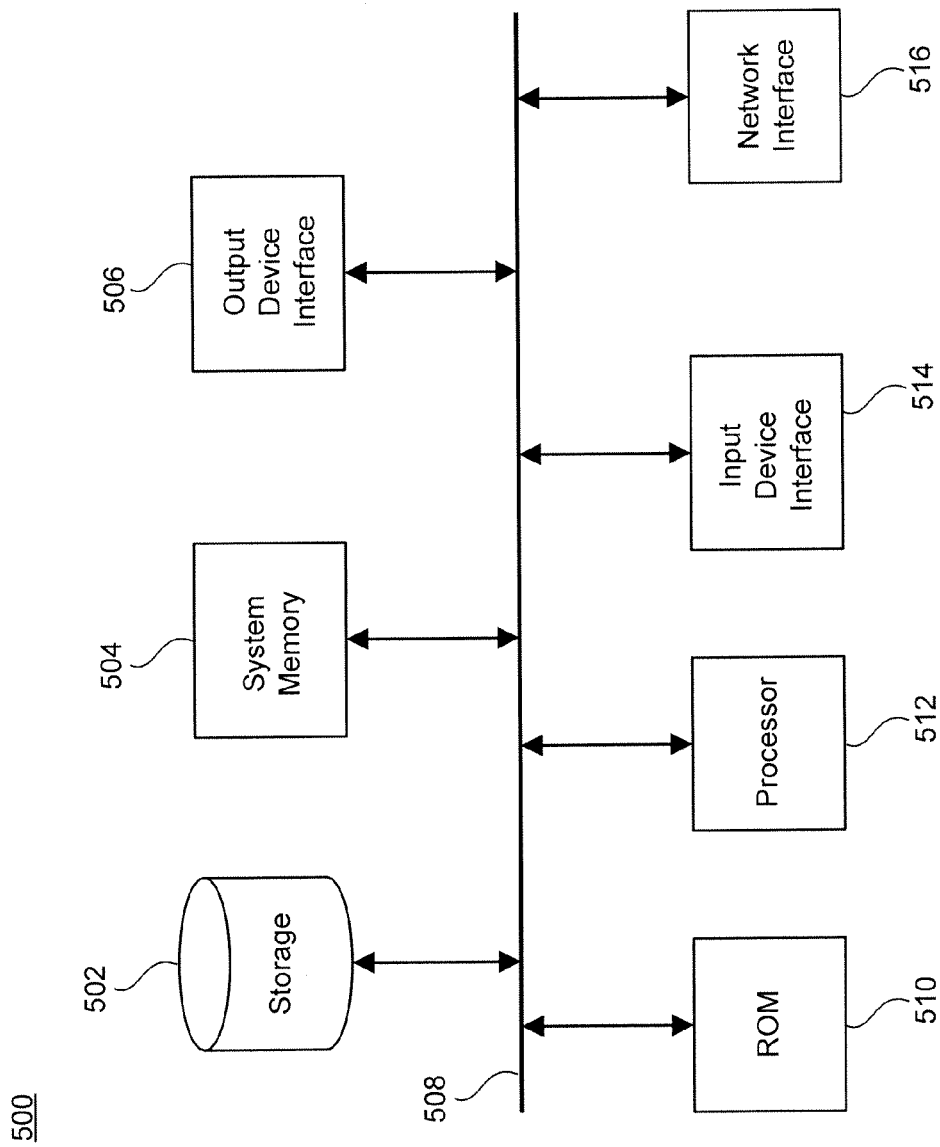
FIG. 5 is a block diagram illustrating an electronic system with which some implementations of the subject technology are implemented.

FIG. 5 conceptually illustrates an electronic system with which some implementations of the subject technology are implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for providing for display of a message within a social networking website in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. Features described under one heading or one subheading of the subject disclosure may be combined, in various embodiments, with features described under other headings or subheadings. Further, it is not necessarily the case that all features under a single heading or a single subheading are used together in embodiments.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for initiating instant messaging within a social networking website, the method comprising:
   providing, using one or more computing devices, for display of a post within the social networking website, the post being associated with a first user and a second user;
   providing, using the one or more computing devices, for display of a graphical component within the social networking website, wherein the graphical component provides an interface for requesting communication related to the post by instant messaging;
   receiving, using the one or more computing devices and via the graphical component, a request for communication related to the post by instant messaging;
   providing, using the one or more computing devices and in response to the received request, for display of a separate window or a separate menu for allowing for selection of users for the communication related to the post by instant messaging;
   receiving, using the one or more computing devices and via the separate window or separate menu, a selection of users for the communication related to the post by instant messaging; and
   initiating, using the one or more computing devices and in response to the received selection, instant messaging between the first user and the selected users in response to the received request for communication related to the post.

2. The method of claim 1, wherein the first user is a poster of the post and the second user is a commenter on the post.

3. The method of claim 1, wherein the request is provided by the second user via the graphical component, and wherein initiating further comprises:
   sending, using the one or more computing devices, a notification to the first user if the first user is idle within the social networking website or offline.

4. The method of claim 1, further comprising:
   providing, using the one or more computing devices, for display of a chat window of the initiated instant messaging, the chat window comprising information associated with the post.

5. The method of claim 4, wherein the information associated with the post comprises text of the post.

6. The method of claim 1, wherein the method further comprises:
   receiving, using the one or more computing devices, a comment on the post from a third user; and
   wherein initiating instant messaging comprises initiating the instant messaging among the first user, the selected users, and the third user.

7. The method of claim 1, further comprising:
   receiving, using the one or more computing devices, a comment on the post from a third user during the initiated instant messaging; and
   sending, using the one or more computing devices, a notification to the first user and the selected users.

8. The method of claim 7, further comprising:
   receiving, using the one or more computing devices, an instruction from the first user or one of the selected users to add the third user to the initiated instant messaging; and
   providing, using the one or more computing devices, for joining the third user to the initiated instant messaging of the first user and the selected users.

9. The method of claim 1, wherein the first user initiates instant messaging between a poster of the post and one or more commenters to the post or between one or more commenters to the post.

10. A system for initiating instant messaging within a social networking website, the system comprising:
    one or more processors; and
    a memory containing processor-executable instruction that, when executed by the one or more processors, cause the system to:
      provide for display of a post within the social networking website, the post being associated with a first user, a second user, and a third user;
      provide for display of a graphical component within the social networking website, wherein the graphical component provides an interface for requesting communication related to the post by instant messaging;
      receive, via the graphical component, a request for communication related to the post by instant messaging;
      provide, in response to the received request, for display of a separate window or a separate menu for allowing for selection of users for the communication related to the post by instant messaging;
      receive, via the separate window or separate menu, a selection of users for the communication related to the post by instant messaging; and
      initiate, in response to the received selection, instant messaging between the first user and the selected users.

11. The system of claim 10, wherein the first user is a poster of the post, the second user is a commenter on the post, and the third user is a commenter on the post.

12. The system of claim 10, wherein the system is further caused to:
    provide for display of the chat window of the initiated instant messaging, the chat window comprising information associated with the post.

13. The system of claim 12, wherein the information associated with the post comprises text of the post.

14. The system of claim 10, wherein the system is further caused to:
    receive a comment on the post from a fourth user during the initiated instant messaging; and
    send a notification to the first user and the selected users.

15. The system of claim 10, wherein the system is further caused to:
    receive an instruction of the first user or one of the selected users to add the fourth user to the initiated instant messaging; and
    provide for the joining of the fourth user to the initiated instant messaging of the first user and the selected users.

16. A method for initiating instant messaging within a social networking website, the method comprising:
    providing for display of a post within the social networking website, the post being associated with a first user, a second user, and a third user;
    providing for display of a graphical component within the social networking website, wherein the graphical component provides an interface for requesting communication related to the post by instant messaging, the interface comprising one of a separate window and a separate menu allowing for selection of users to be invited to communicate by instant messaging;
    receiving a request for communication related to the post by instant messaging via the graphical component;
    initiating instant messaging between the first user, the second user, and the third user in response to the received request for communication related to the post;
    providing for the display of a chat window of the initiated instant messaging, the chat window comprising information associated with the post, wherein all users invited into the initiated instant messaging are listed in a heading of the chat window; and
    sending a notification to each user of the first user, the second user, and the third user that is idle within the social networking website or offline.

17. The method of claim 16, wherein the first user is a poster of the post, the second user is a commenter on the post, and the third user is a commenter on the post.

18. The method of claim 16, wherein the information associated with the post comprises text of the post.

19. The method of claim 16, further comprising:
    receiving a comment on the post from a fourth user during the initiated instant messaging; and
    sending a notification to the first user, the second user, and the third user.

20. The method of claim 19, further comprising:
    receiving an instruction of the first user, the second user, or the third user to add the fourth user to the initiated instant messaging; and
    providing for the joining of the fourth user to the initiated instant messaging of the first user, the second user, and the third user.

* * * * *